(No Model.)  2 Sheets—Sheet 1.

A. B. HALL.
CAPSULE MACHINE.

No. 297,792.  Patented Apr. 29, 1884.

WITNESSES:
Frank A. Jacob,
C. E. Sickler.

INVENTOR:
Albert B. Hall.
By H. P. Hood.
Atty.

(No Model.) 2 Sheets—Sheet 2.

A. B. HALL.
CAPSULE MACHINE.

No. 297,792. Patented Apr. 29, 1884.

WITNESSES:
Frank A. Jacob
C. E. Sickles

INVENTOR:
Albert B. Hall
By H. P. Hood
Atty.

UNITED STATES PATENT OFFICE.

ALBERT B. HALL, OF INDIANAPOLIS, INDIANA.

CAPSULE-MACHINE.

SPECIFICATION forming part of Letters Patent No. 297,792, dated April 29, 1884.

Application filed October 8, 1883. (No model.)

*To all whom it may concern:*

Be it known that I, ALBERT B. HALL, a citizen of the United States, residing at Indianapolis, in the county of Marion and State of Indiana, have invented certain new and useful Improvements in Capsule-Machines, of which the following is a specification.

My improvements relate to the mold for molding the capsules of gelatine or other like substance, the means for cutting the capsules to a uniform length, and the means for removing the capsules from the rolls, my object being to provide an improved mold adapted to form a series of capsules by dipping the mold into a solution of capsule material, and an improved machine adapted to automatically cut said capsules to a uniform length and remove them from the mold, said mold and said machine being mutually adapted to co-operate to produce the required result.

The accompanying drawings illustrate my invention.

Figure 1:
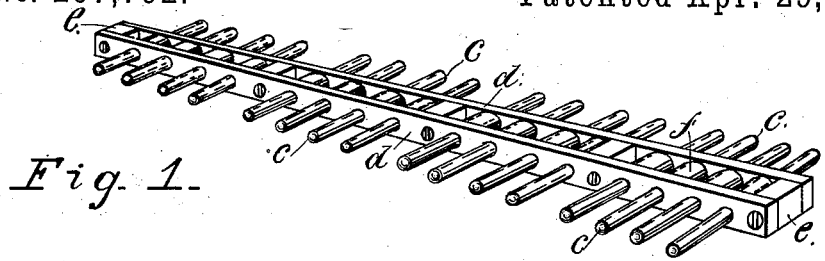
Figure 2:
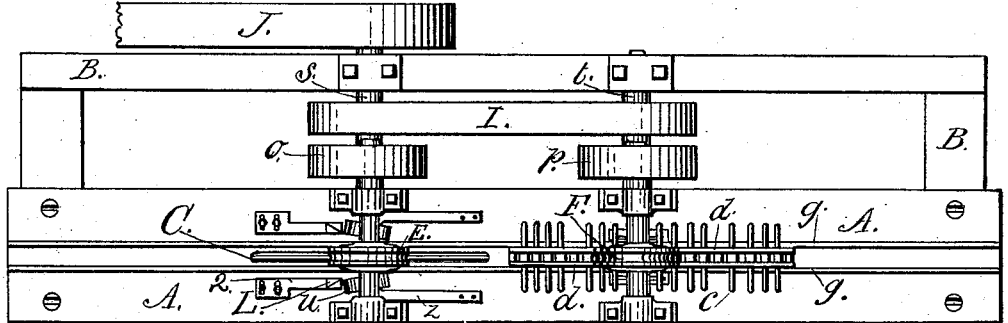
Figure 3:
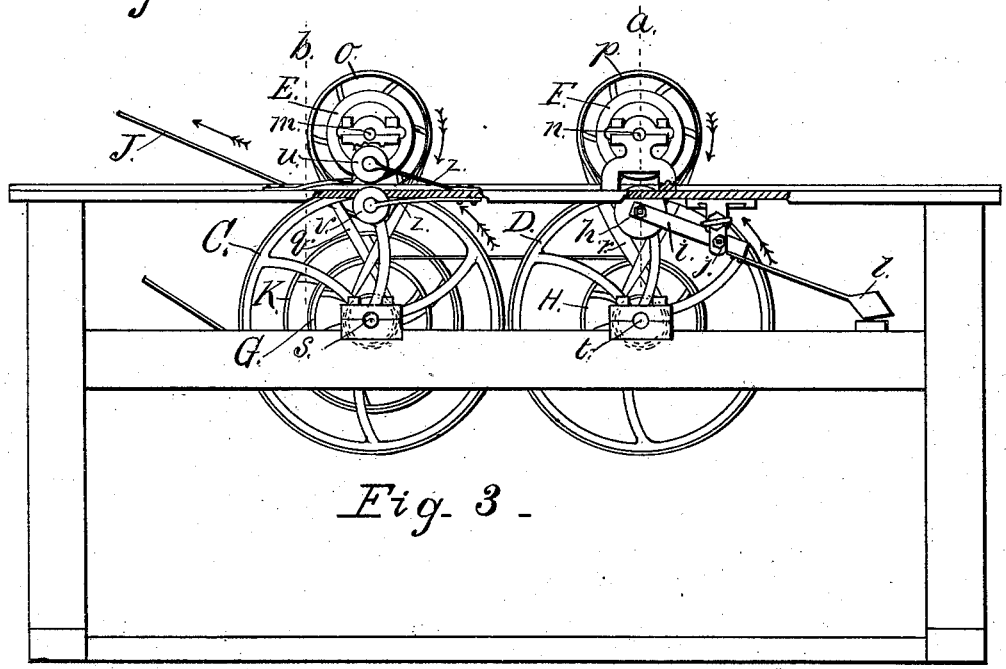
Figure 5:
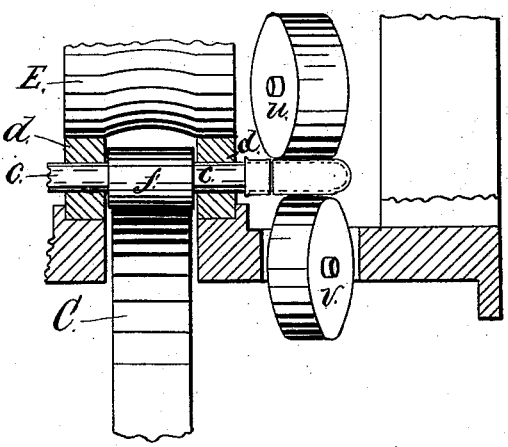
Figure 4:
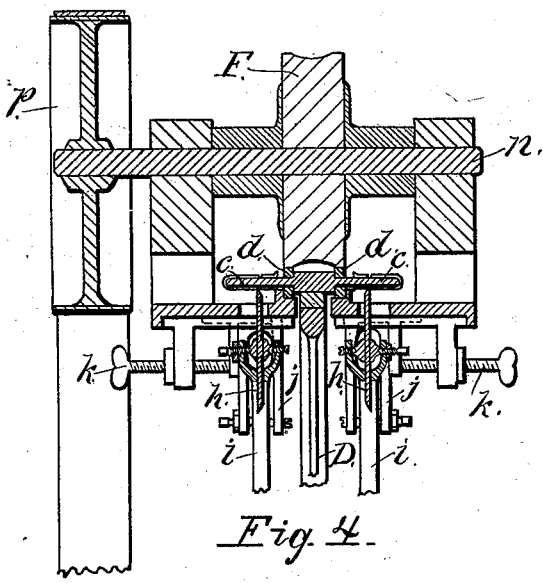
Figure 6:
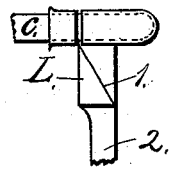

Figure 1 is a perspective view of the mold. Fig. 2 is a plan of the machine. Fig. 3 is a side elevation of the same. Fig. 4 is a transverse section through the line $a\,a$, Fig. 3. Fig. 5 is an enlarged partial section through the line $b\,b$, Fig. 3. Fig. 6 is an enlarged plan of the stripper.

Like letters indicate the same parts in all the views.

The mold, Fig. 1, consists of a series of cylindrical rods, $c\,c$, having rounded ends, and mounted in a frame formed of two parallel bars, $d\,d$, connected by end pieces, $e\,e$. Said bars form bearings in which rods $c$ are journaled and are adapted to revolve easily. Said rods are prevented from sliding endwise in their bearings by a central cylindrical enlarged portion, $f$, which also serves as a pulley by which the rods are revolved, as hereinafter explained. The ends of rods $c$ are rounded to form a rounded end to the capsule, and they may project from one or both sides of the frame formed by the bars $d\,d$, their length being somewhat more than the desired length of the capsule. When the rods $c$ project from one side only of the frame, a single series of molds is presented, and when they project from both sides a double series of molds is presented, each one of which may be revolved by the frictional contact of its enlarged cylindrical portion $f$ with a moving surface. The capsules are formed on the projecting ends of rods $c$, by holding the frame and rods over a solution of capsule material and dipping the rods therein, a sufficient portion of the material adhering to the rods and when dry forming the capsules. The capsules thus formed have irregular edges and are longer than desired. For the purposes of cutting said capsules to a uniform length with clean true edges, and of removing them from the rods, the mold is placed in the machine illustrated in the remaining figures, in which A represents a flat plate supported on a framework, B, and having on its upper surface a pair of parallel guides, $g\,g$. Said guides are at such a distance apart that the frame of the mold will slide freely between them, the lower edges of the bars $d\,d$ resting on the table between the guides.

C D are friction-wheels mounted on shafts $s\,t$, resting in bearings on frame B, their peripheries projecting slightly above table A, through suitable openings therein.

$h\,h$ are thin disks of steel having knife-edges. Each of said disks is mounted on pivots in a lever, $i$, which is in turn pivoted to a sliding bracket, $j$, arranged to slide in ways secured underneath and across table A. The position of bracket $j$ is controlled and adjusted by a thumb-screw, $k$. Lever $i$ is weighted, as at $l$, so as to hold the periphery of disk $h$ with a yielding pressure upward through a suitable opening in plate A.

E and F are friction-wheels, preferably of rubber, mounted on shafts $m$ and $n$, above plate A, and driven by pulleys $o$ and $p$ and cross-belts $q$ and $r$. Said cross-belts pass over pulleys secured to shafts $s$ and $t$, which also carry driving-pulleys G and H, which are connected by a belt, I. A belt, J, passing over a pulley, K, secured to shaft $s$, gives motion to the whole.

$u\,v$ are friction-wheels mounted on spring-bearings $z\,z$, one above and one below plate A. Said wheels are so set as to revolve in a plane at an acute angle to the line of the parallel guides $g\,g$, for the purpose of releasing the capsules from their molds, as hereinafter explained.

L is a block having its upper surface beveled each way from a diagonal line, 1, drawn across its face, thus presenting an obtuse ridge on said line. Said block is mounted on a spring, 2, secured at one end to the upper surface of plate A.

The operation of my machine is as follows: The rough capsules having been formed on the mold, Fig. 1, as hereinbefore explained, the mold is placed on plate at the right-hand end, between the guides $g\ g$. Motion being given to belt J, the friction-wheels C, D, E, and F are revolved in the direction indicated by the arrows. The mold being now slid forward between the guides, the upper edges of bars $d\ d$ come in contact with the periphery of friction-wheel F, and the mold is then drawn forward by said wheel. As the mold moves forward, the capsules on the rods $c$ are successively brought in contact with the disk-knives $h\ h$, which press upward against the capsules with a light yielding pressure, determined by the weight $l$. At the same time the central enlarged portions, $f$, of the rods are successively brought in contact with the rapidly-moving periphery of wheel D, and the capsules are rapidly revolved thereby in contact with disks $h$, which also revolve by frictional contact with the capsules, and cut them to a uniform length. As the mold-frame leaves friction-wheel F, it is caught under wheel E, and still carried forward, the rods $c$ and the capsules being revolved by wheel C, and the capsules at the same time passing between the friction-rolls $u\ v$, which are pressed closely against the capsule by their spring-supports $z\ z$. The frictional contact of the capsules with wheels $u\ v$, causes said wheels to revolve, and the capsule being thus rolled between the rod on which it is molded and said wheels, its walls are slightly thinned, and its diameter thereby slightly increased, thus freeing it from the rod. The plane of revolution of the wheels $u\ v$ being at an angle to the line of movement of the mold, the capsule is drawn outward on the rod. As the capsule moves out from under wheels $u\ v$, it comes in contact with the stripping-block L, the ridge 1 of which engages the capsule and forces it off the mold.

I am aware of the patent to Wood, May 23, 1882, for a capsule-machine, and I do not herein claim anything therein shown.

Having thus described my invention, I claim as new and of my invention—

1. In a capsule-machine, a mold for forming capsules, consisting of a pair of parallel bars suitably connected to form a frame, and a series of rods journaled and adapted to revolve in said frame, each of said rods being provided with a pulley, $f$, all combined substantially as and for the purpose specified.

2. The combination, with a capsule-mold formed of a pair of parallel bars suitably connected to form a frame, and a series of rods journaled and adapted to revolve in said frame, of a device adapted for cutting to a length capsules formed on said rods, said device consisting of the following elements, combined substantially as specified, namely: a bed-plate having parallel guides thereon, adapted to receive and guide the bars of said mold, a knife or knives attached to said bed-plate in such position as to come in contact with the rods of said mold, means for propelling said mold along said bed-plate between said guides, and a friction-wheel arranged to impinge against said rods, and to revolve them by the frictional contact of its periphery therewith.

3. In a capsule-machine, the combination of plate A, having guides $g\ g$ thereon, friction-wheels F and D, shafts $t$ and $n$, and disk $h$, mounted in a yielding bearing and adjustably secured to said plate, all substantially as and for the purpose specified.

4. In a capsule-machine, the combination of plate A, having guides $g\ g$ thereon, friction-wheels E and C, shafts $s$ and $m$, and friction-wheels $u$ and $v$, mounted in yielding bearings secured to said plate, and arranged to revolve in a plane at an acute angle with said guides, substantially as and for the purpose specified.

ALBERT B. HALL.

Witnesses:
E. E. SICKLER,
H. P. HOOD.